United States Patent
Lamy et al.

(10) Patent No.: US 9,212,954 B2
(45) Date of Patent: Dec. 15, 2015

(54) METHOD FOR TEMPERATURE MEASUREMENT

(75) Inventors: Jerome Lamy, Espoo (FI); Heikki Seppä, Espoo (FI)

(73) Assignee: Teknologian Tutkimuskeskus VTT (FI)

( * ) Notice: Subject to any disclaimer, the term of this patent is extended or adjusted under 35 U.S.C. 154(b) by 0 days.

(21) Appl. No.: 13/505,744

(22) PCT Filed: Nov. 3, 2010

(86) PCT No.: PCT/FI2010/050880
§ 371 (c)(1),
(2), (4) Date: Jul. 23, 2012

(87) PCT Pub. No.: WO2011/055014
PCT Pub. Date: May 12, 2011

(65) Prior Publication Data
US 2012/0275489 A1    Nov. 1, 2012

(30) Foreign Application Priority Data

Nov. 5, 2009   (FI) ...................................... 20096141

(51) Int. Cl.
*G01K 7/00*    (2006.01)
*G01K 7/32*    (2006.01)
*G01K 1/02*    (2006.01)

(52) U.S. Cl.
CPC . *G01K 7/32* (2013.01); *G01K 1/024* (2013.01)

(58) Field of Classification Search
CPC .................................................. G06K 19/0675
See application file for complete search history.

(56) References Cited

U.S. PATENT DOCUMENTS

| | | | |
|---|---|---|---|
| 4,471,354 A | 9/1984 | Smith | |
| 6,950,028 B2 * | 9/2005 | Zweig | 340/588 |
| 7,068,173 B2 * | 6/2006 | Shanks et al. | 340/572.4 |
| 7,461,972 B2 * | 12/2008 | Cohen | 374/100 |
| 7,620,119 B2 * | 11/2009 | Narendra et al. | 375/316 |
| 2005/0174239 A1 * | 8/2005 | Shanks et al. | 340/572.1 |
| 2005/0248438 A1 * | 11/2005 | Hughes et al. | 340/10.4 |
| 2005/0248455 A1 * | 11/2005 | Pope et al. | 340/539.27 |
| 2005/0276307 A1 | 12/2005 | Song et al. | |
| 2007/0205916 A1 * | 9/2007 | Blom et al. | 340/870.17 |
| 2007/0222590 A1 * | 9/2007 | Posamentier | 340/539.26 |
| 2008/0136641 A1 * | 6/2008 | Kean | 340/572.1 |
| 2008/0309490 A1 * | 12/2008 | Honkanen et al. | 340/572.1 |

FOREIGN PATENT DOCUMENTS

| | | |
|---|---|---|
| JP | 2004144683-X | 5/2004 |
| JP | 2009162700 A | 7/2009 |
| WO | WO03098175 A1 | 11/2003 |

OTHER PUBLICATIONS

Zhou Shenghua; Wu Nanjian, "A Novel Ultra Low Power Temperature Sensor for UHF RFID Tag Chip", IEEE Solid-State Circuits Conference, Publication Year: 2007, pp. 464-467.*

(Continued)

*Primary Examiner* — Lisa Caputo
*Assistant Examiner* — Nasir U Ahmed

(57) ABSTRACT

This document describes a method for measuring temperature. In accordance with the invention the temperature is determined from frequency variation of a local oscillator of a RFID tag (1).

8 Claims, 7 Drawing Sheets

(56) References Cited

OTHER PUBLICATIONS

Vali Najafi et al, "A Dual Model EPC Gen 2 UHF RFID Transponder in 0.18 μm CMOS"", IEEE Electronics, Circuits and Systems, Publication Year: 2008 , pp. 1135-1138.*

Yin et al. "A System-on-Chip EPC Gen-2 Passive UHF RFID Tag with Embedded Temperature Sensor", IEEE Jounal of Solid-State Cuircuits, vol. 45, pp. 2404-2420, Nov. 2010.*

Namjun Cho, Seong-Jun Song, Jae-Youl Lee, Sunyoung Kim, Shiho Kim, and Hoi-Jun Yoo, "A 8-uW, 0.3-mm2 RF-Powered Transponder with Temperature Sensor for Wireless Environmental Monitoring", IEEE International Symposium on Circuits and Systems, 2005. ISCAS 2005, pp. 4763-4766.*

Sunghyun Park et al. A 95nW ring oscillator-based temperature sensor for RFID tags in 0.13 (my)m CMOS, Circuits and Systems, 2009 ISCAS 2009, IEEE International Symposium on, IEEE, Piscataway, NJ, USA, May 24, 2009, pp. 1153-1156.

Zhou Shenghua et al: "A novel ultra low power temperature sensor for UHF RFID tag chip", 2007 IEEE Asian Solid-State Circuits Conference IEEE Piscataway, NJ, USA, 2007, pp. 464-467.

* cited by examiner

METHOD FOR TEMPERATURE MEASUREMENT

TECHNICAL FIELD

The present invention relates generally to temperature measurement.

In particular, the method relates to temperature measurement with RFID technology.

BACKGROUND ART

Existing sensor tags are expensive custom ICs, manufactured in limited quantity, and require specific commands and readers.

DISCLOSURE OF INVENTION

Therefore, it is an object of the present invention to provide a new method for temperature measurement.

This invention describes how a standard RFID tag can be used to measure the environment temperature remotely, without specific command or custom tag. The principle is demonstrated with the Gen2 EPC protocol, but can be applied to other tags containing on-chip oscillators. The measurement is based on the variation of frequency of the tag internal oscillator, and the preamble of the transmission EPC protocol.

According to an aspect of the invention, the frequency variation is determined by a RFID reader device 2 by varying the transmission timing sequence TRcal, 3.

More specifically, the method according to the invention is characterized by what is stated in the characterizing portion of claim 1.

For its part, the use according to the invention is characterized by what is stated in claims 8-12.

Considerable advantages are gained with the aid of the invention.

The invention also has several embodiments that may provide certain advantages over the previously known temperature measurement methods.

According to an embodiment invention can be used by reader manufacturer to add the temperature sensor functionality to their system, with cheap, widely available, standard tags.

This invention does not need specific hardware on the tag and does not increase the power consumption, thus the reading distance remains identical. Each tag can be calibrated and the data stored in the tag memory itself.

Compared to existing RFID sensor tags, the solution described in this invention uses standard tags, widely available for a fraction of the price of proprietary tags. The principle is simple to implement in the reader software. The temperature sensing functionality does not increase the power consumption, so the same reading range is available for the measure (typically up to 10 meters). The required calibration information can be stored in the tag memory itself.

In several cases, a direct measurement of a quantity can be converted into a temperature measurement, e.g., the opacity of the liquid prevent light from penetrating through the liquid and the temperature of the illuminated tag will be reduced. By measuring the tag temperature, the liquid opacity can be deduced. This only means that many quantities can be measured with a wireless temperature sensor.

The invention has also several other embodiments providing associated advantages.

BRIEF DESCRIPTION OF DRAWINGS

For a more complete understanding of the present invention and the advantages thereof, the invention is now described with the aid of the examples and with reference to the following drawings, in which.

BEST MODE FOR CARRYING OUT THE INVENTION

In the following, the theory and examples in accordance with the invention are discussed more thoroughly.

Figure 1:
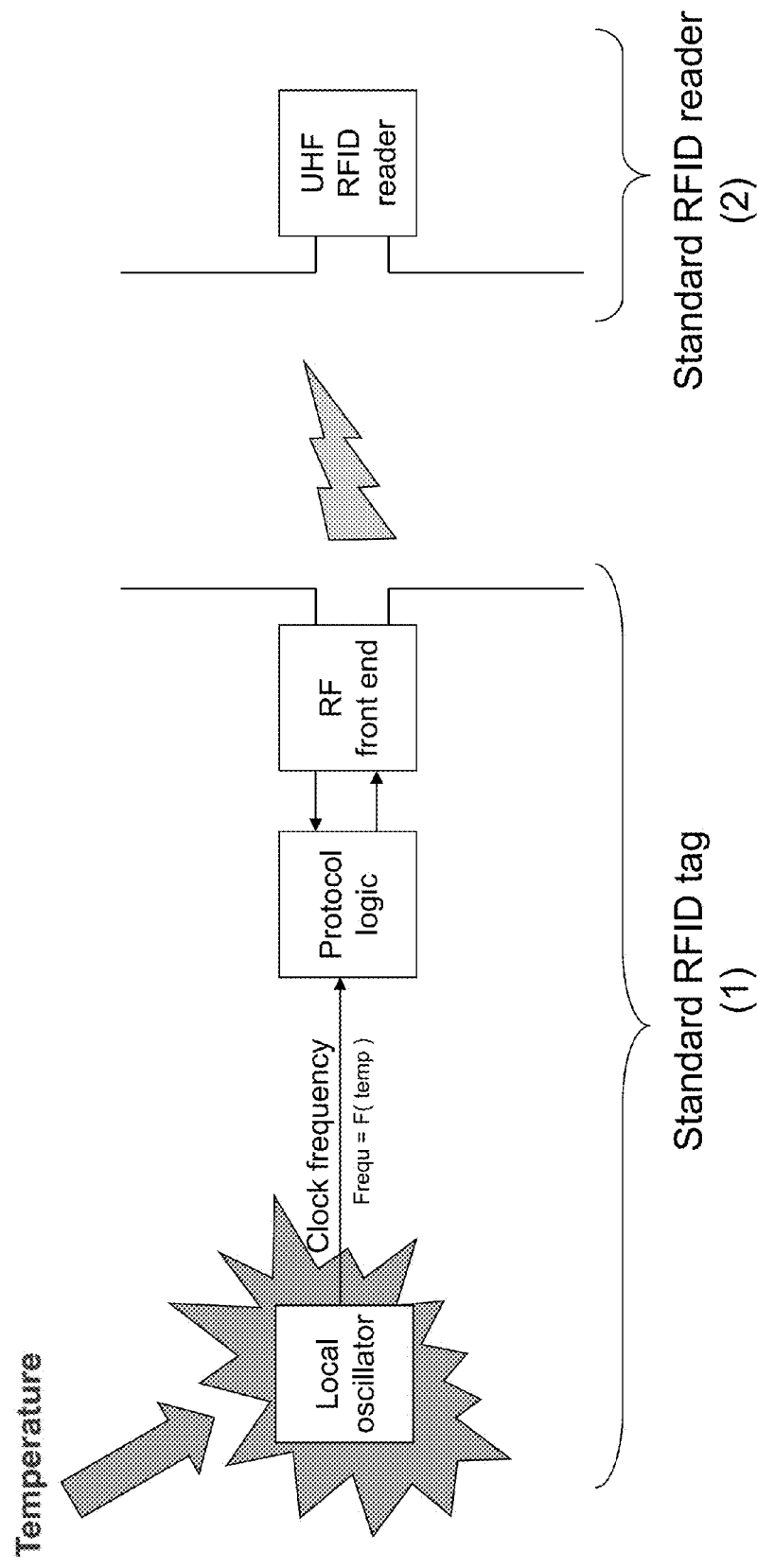
FIG. 1 presents a block diagram of the general principle of the system suitable for the invention.

In accordance with FIG. 1 the temperature affects the frequency of the on chip oscillator of the RFID tag 1. The tag 1 is read by RFID reader device 2. The frequency of the tag 1 local oscillator is determined by a method described in detail later in this document. This protocol is not sensitive to this variation of frequency, by design. With an appropriate method, it is possible to determine the tag clock frequency. The tag frequency is proportional to the temperature.

In accordance with FIGS. 6a and 6b, in order to get rid of the maximum of noise and unknown parameters, the temperature is increased or decreased by steps.

Following things are assumed:
- the UHF tag internal oscillator is typically based on a ring oscillator
- the ring oscillator frequency is proportional to the tag temperature
- the ring oscillator frequency dependency has been characterized Temperature affects every electronic device. In a UHF RFID tag, the local oscillator frequency is proportional to the temperature, as shown in FIG. 1. The clock frequency of the logic varies with the temperature.

Figure 2:
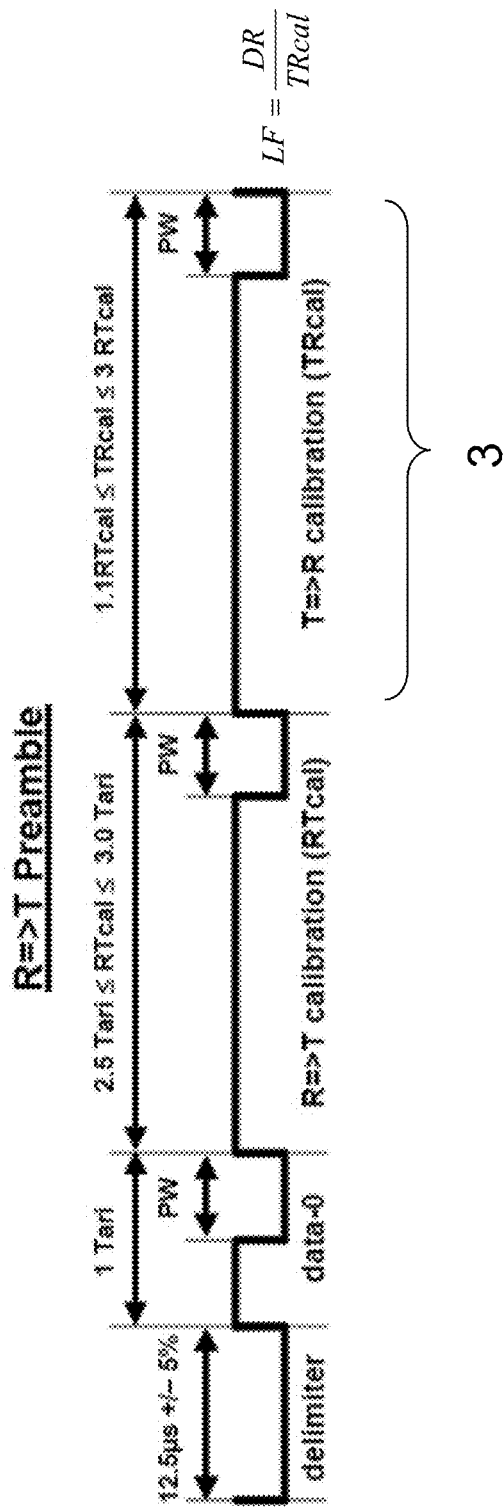
FIG. 2 presents the EPC preamble chronogram in accordance with the invention.

The EPC protocol used at UHF does not use the local oscillator frequency to backscatter the tag answer, but a function of the reader preamble duration as shown in FIG. 2. The temperature therefore does not affect the data transmission.

Figure 3:
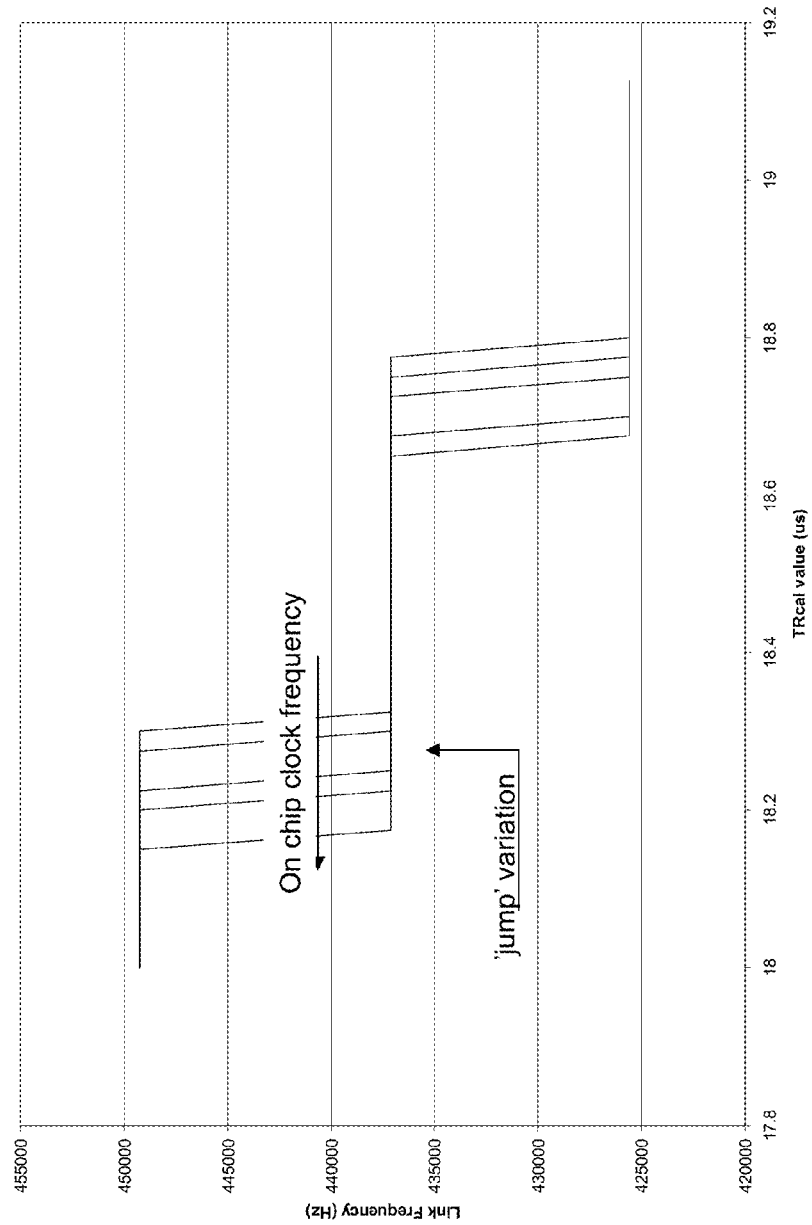
FIG. 3 presents graphically the simulated link frequency dependence with TRcal duration in accordance with the invention.

With this invention it is possible to determine the tag local oscillator frequency, as the value of TRcal inducing a jump of the link frequency decreases with the temperature. This is simulated on the FIG. 3. The technical reason is the discretisation of the TRcal duration in the tag logic.

Figure 4A:
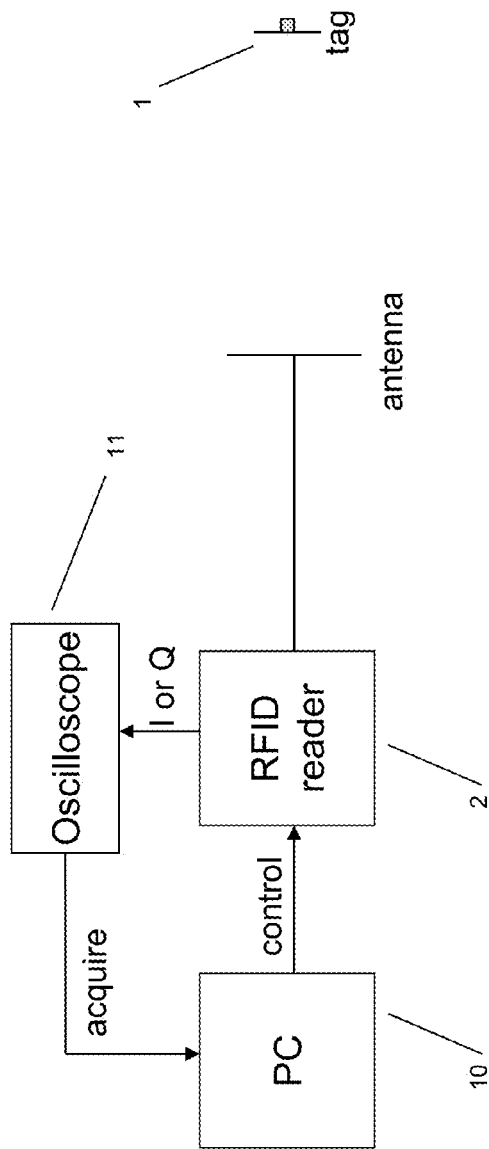
FIGS. 4a and 4b present the block diagrams of the system used to demonstrate the invention, and the possible future integration.
Figure 4B:
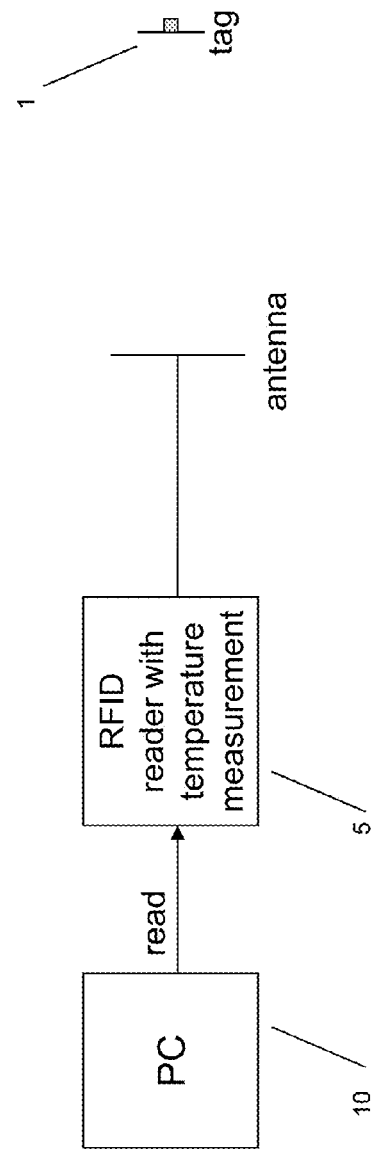

The FIGS. 4a and 4b show the system used for determining the tag temperature dependency and how this invention can be directly integrated in a RFID reader. In the experiment, a computer 10 controls a standard RFID reader 2. The computer adjust the preamble parameter TRcal 3 and queries the tag 1 ID. The demodulated output of the reader is acquired by an oscilloscope 11 and analyzed by the computer to determine the link frequency of the response.

In the FIG. 4b the temperature reading function is integrated into the reader 5. The computer 10 directly requests the tag ID and its temperature.

Figure 5:
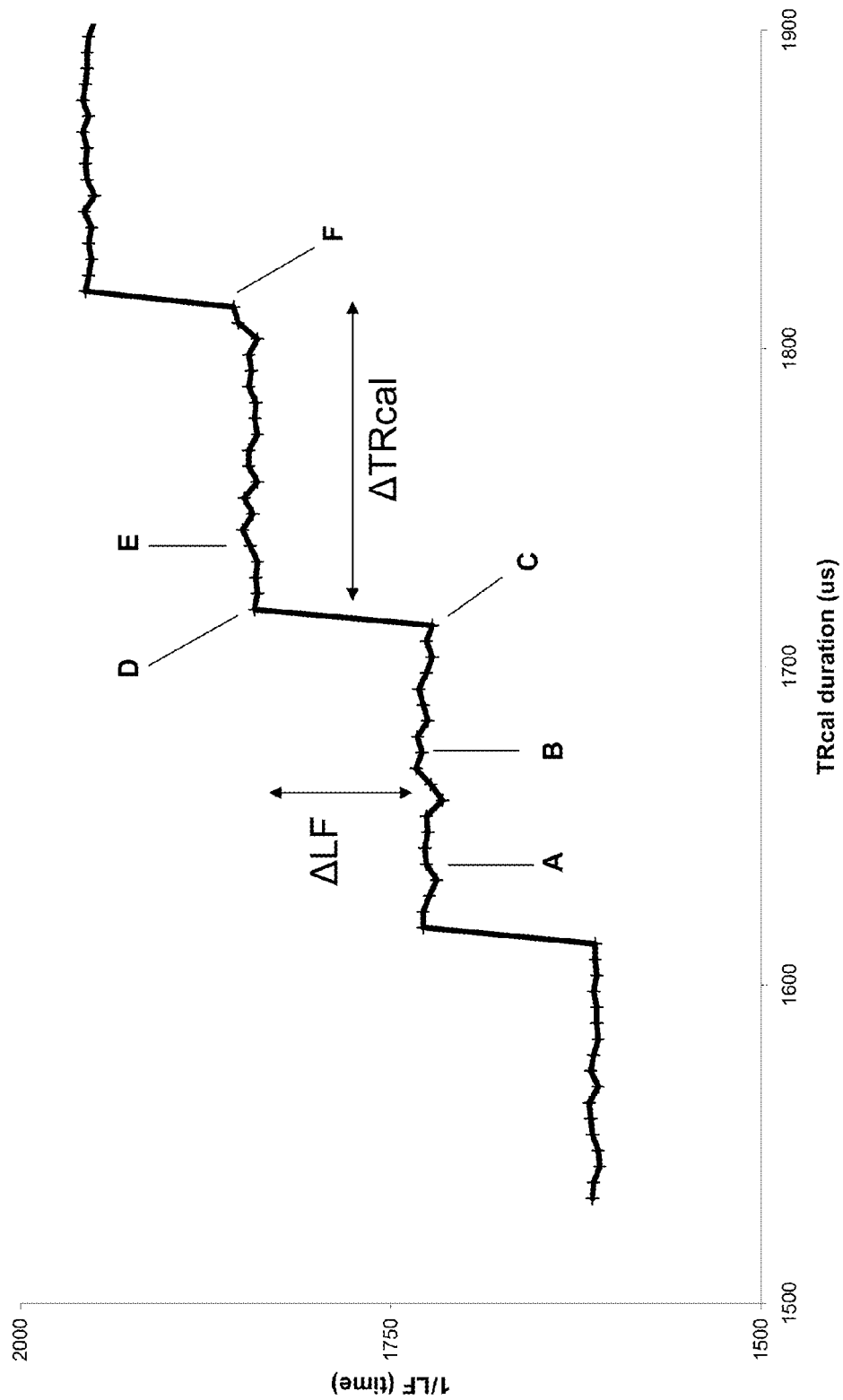
FIG. 5 presents an example of TRcal sweep used to determine the tag temperature.

In accordance with FIG. 5 the frequency of the local oscillator gets discrete values with different TRcal sequence lengths. On the y axis is presented 1/LF and x axis represents TRcal 3 in microseconds.

At constant temperature the LF 'jumps' as expected.

The incoming signal is very noisy, the measurement of LF is not accurate (noise is visible on this figure).

The TRcal value inducing a jump in LF is easy to determine with an appropriate threshold.

By sweeping the TRcal parameter and measuring the Link Frequency of the backscattered tag response, the reader can acquire a curve similar to FIG. 5. The points A, B and E are chosen randomly. The points C, D and F are located on the step edges.

By using one or more couple (TRcal, LF) it is possible for the reader to determine the tag oscillator frequency, and thus the tag temperature. The reader can use:
- one or more ΔLF (for example $LF_A - LF_E$)
- one or more 'difference of jump value' ΔTRcal (for example $TR_C - TR_F$)
- one or more absolute jump TRcal value (for example $TR_C$)
- one or more couple random point 'TRcal and corresponding LF' (for example $(TR_B, LF_B)$)
- one or more couple 'jump TR value and corresponding LF' (for example $(TR_C, LF_C)$)
- one or more triplet defining a step (for example $TR_C, TR_F, LF_F$)
- a combination of the above methods To show how the TRcal sweep information (FIG. 5) can be used by the reader, two methods will be described.

First method: using one ΔLF
- the reader issues a command requesting a response to the tag the preamble of the command specifies the TRcal timing, used by the tag to generate the backscattering frequency LF,
- the tag measures the TRcal 3 duration with its own oscillator clock the TRcal 3 is a discrete value in the tag logic (TRcount),
- the tag 1 backscatters the response using the discrete LF value $$TRcount = round(TRcal \cdot f_{clk})$$

$$LF = \frac{DR}{TRcal} = \frac{DR \cdot f_{clk}}{TRcount}$$

- the reader 2 measures precisely the backscattered LF frequency ($LF_A$),
- the reader 2 issues another command, with a small increase of the TRcal 3 timing if the variation is large enough, the tag discrete value of TRcount will increase of one unit and the backscattered $LF_B$ frequency will therefore be slightly slower $$LF_A = \frac{DR \cdot f_{clk}}{TR_A} \text{ and } LF_B = \frac{DR \cdot f_{clk}}{TR_B}$$

$$TR_B = TR_A + 1$$

$$\frac{TR_A}{f_{clk}} = \frac{DR}{LF_A} \text{ and } \frac{TR+1}{f_{clk}} = \frac{DR}{LF_B}$$

with these two LF measurements, the reader 2 can deduce the tag ring oscillator frequency:

$$f_{clk} = \frac{LF_A \cdot LF_B}{DR \cdot (LF_A - LF_B)}$$

the reader can get the ring oscillator calibration parameter from the tag memory and estimate the tag temperature using the linear dependency of the ring oscillator frequency:

$$f_{clk} = TC \cdot Temp + offset$$

Figure 6:
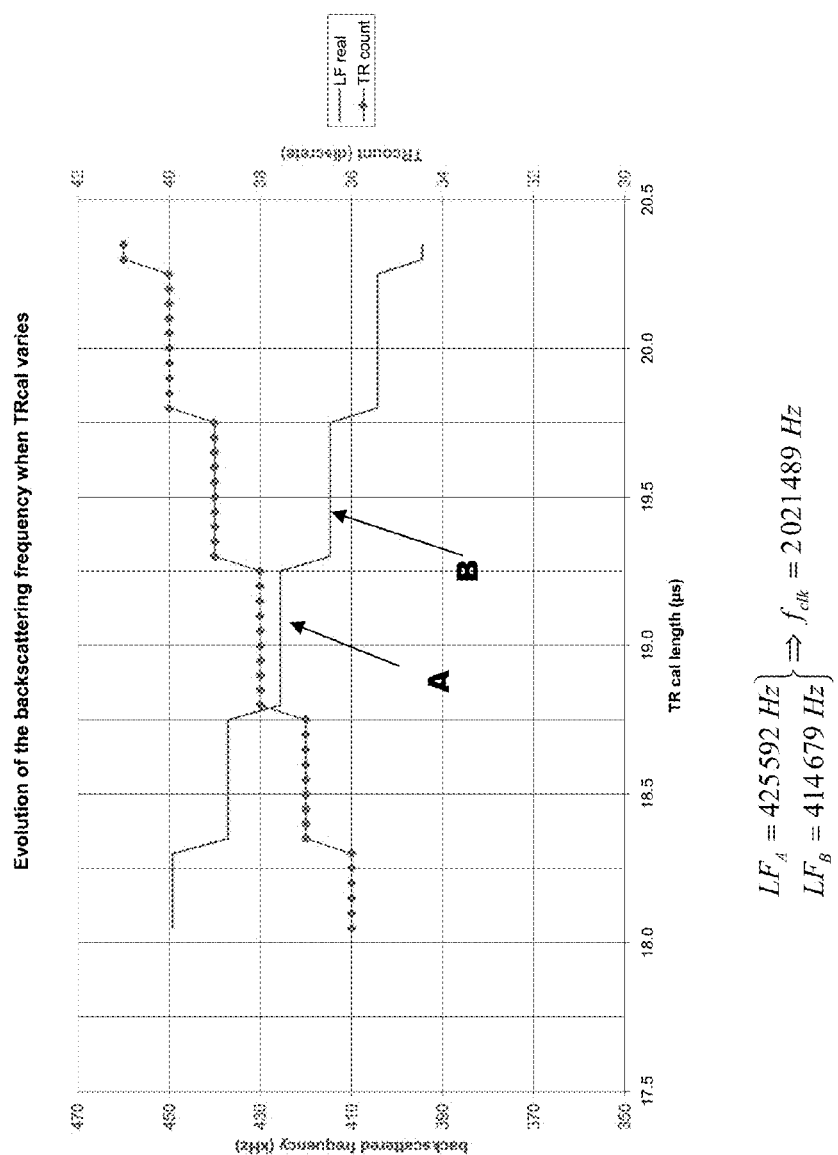
FIG. 6 presents a simulation of the determination of the tag oscillator frequency using the difference of backscattering frequency.

A simulation of the method is presented in FIG. 6.

Second method: using the jump TRcal value

Figure 7:
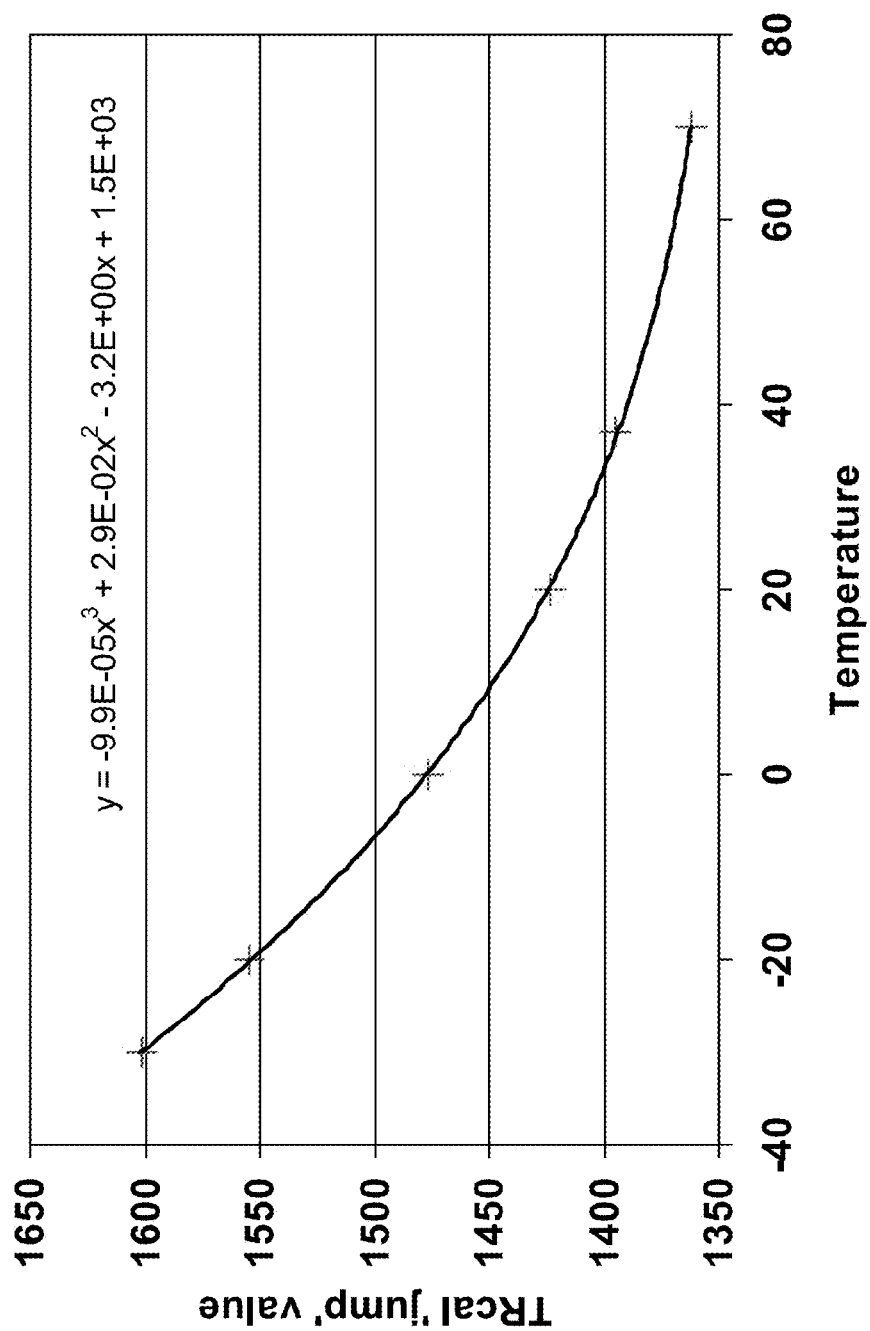
FIG. 7 presents graphically the measured TRcal jump value as a function of temperature in accordance with the invention.

Another method to determine the tag temperature is to observe the variation with temperature of the jump TRcal value 3. The FIG. 7 presents this evolution on a large temperature range, form −30° C. to +70° C. for one tag. The curve is monotonic and can be fitted with a polynomial function.

The performance of the temperature measurement depends heavily on the tag family. The sensibility given below is an example; some tag family may more sensitive while other families may appear less sensitive. The sensitivity is usually temperature dependant. The sensitivity is greater at low temperature.
- at −20° C., about 0.2° C. per digit
- at 0° C., about 0.3° C. per digit
- at +20° C. About 0.5° C. per digit The measurement range is the same as the tag operating temperature range. Usually the tags operate from −40° C. to +80° C.

The acquisition time is equivalent to n reading operations. Usually n<10. The acquisition time is therefore smaller than one second. For better accuracy the measurement can be averaged.

The polynomial function fitting the evolution of TRcal jump value with temperature can be obtained by measuring a tag at different ambient temperatures. For a better accuracy, the tags can be calibrated individually. For a lower cost, the calibration can be unique for the family of tag. The coefficients can be stored in the tag memory, or in a centralized database.

In one advantageous solution the temperature dependence of the tag 1 is determined for a set of RFID-tags based on the manufacturer of the tag 1, or for precise measurement each tag 1 is calibrated individually. Alternatively the calibration of tags is made for samples of manufactured tags 1.

In accordance with the invention the local oscillator frequency information of a RFID tag can be used for temperature measurement, especially for temperature measurement of human body. The invention may be used also for determining humidity information by temperature measurement. One implementation for the invention is also temperature measurement of food, especially temperature control of food cold chain.

In connection with the invention following things may be needed in connection with the invention:
- the UHF tag internal oscillator is typically based on a ring oscillator
- the ring oscillator frequency is proportional to the tag temperature
- the ring oscillator frequency dependency has been characterized

The invention claimed is:

1. A method for measuring temperature comprising the steps of:
   performing a frequency variation of a single local oscillator of a RFID tag by varying a transmission timing sequence associated with the single oscillator of the RFID tag, the RFID tag having different timings;
   measuring the frequency variation at the single local oscillator of the RFID tag by measuring a first backscattered frequency and a second backscattered frequency with respect to backscattered signals from the RFID tag using information of the single local oscillator in the RFID tag, wherein the second backscattered frequency is less than the first backscattered frequency;
   determining an RFID tag ring oscillator frequency using the first backscattered frequency and the second backscattered frequency; and
   determining an RFID tag temperature using, in part, a linear dependency of the RFID tag ring oscillator frequency.

2. A method in accordance with claim 1, wherein the frequency variation is determined by an RIM reader device by varying the reader preamble timing, in particular the duration of TRcal.

3. A method in accordance with claim 1, wherein the frequency variation is determined by an RFID reader device by varying the transmission timing sequence by using at least three different timing values during multiple transmissions.

4. A method in accordance with claim 1, wherein the determination of the frequency of the local oscillator is performed with the following sequence: the reader issues a command requesting a response to the tag,
   wherein the preamble of the command specifies the TRcal timing used by the tag to generate the backscattering frequency LF,
   the tag measures the TRcal duration with its own oscillator clock,
   wherein the TRcal is a discrete value in the tag logic,
   the tag backscatters the response using the discrete LF value $$TRcount = round(TRcal \cdot f_{clk})$$

$$LF = \frac{DR}{TRcal} = \frac{DR \cdot f_{clk}}{TRcount},$$

the reader measures precisely the backscattered LF frequency,
   the reader issues another command, with a small increase of the TRcal timing
   if the variation is large enough, the tag discrete value of TRcount will increase by one unit, the backscattered $LF_B$ frequency will therefore be slightly slower $$LF_A = \frac{DR \cdot f_{clk}}{TR_A} \text{ and } LF_B = \frac{DR \cdot f_{clk}}{TR_B}$$

$$TR_B = TR_A + 1$$

$$\frac{TR_A}{f_{clk}} = \frac{DR}{LF_A} \text{ and } \frac{TR+1}{f_{clk}} = \frac{DR}{LF_B},$$

with these two LF measurements, the reader deduces the tag ring oscillator frequency:

$$f_{clk} = \frac{LF_A \cdot LF_B}{DR \cdot (LF_A - LF_B)},$$

the reader gets the ring oscillator calibration parameter from the tag memory and estimates the tag temperature using the linear dependency of the ring oscillator frequency:

$$f_{clk} = TC \cdot \text{Temp} + \text{offset}.$$

5. A method in accordance with claim 1, wherein temperature dependence of the tag is determined for a set of RFID-tags based on the manufacturer of the tag.

6. A method in accordance with claim 1, for precise measurement.

7. A method in accordance with claim 1, wherein calibration of tags is made for samples of manufactured tags.

8. A method for measuring temperature comprising the steps of:
   performing a frequency variation of a single local oscillator of a RFID tag by varying a transmission timing sequence associated with the single oscillator of the RFID tag, the RFID tag having different timings;
   measuring the frequency variation at the single local oscillator of the RFID tag by measuring a first backscattered frequency and a second backscattered frequency with respect to backscattered signals from the RFID tag using information of the single local oscillator in the RFID tag, wherein the second backscattered frequency is less than the first backscattered frequency;
   determining an RFID tag ring oscillator frequency using the first backscattered frequency and the second backscattered frequency; and
   determining an RFID tag temperature using, in part, a linear dependency of the RFID tag ring oscillator frequency, wherein the RFID tag temperature is determined using only the single local oscillator of the RFID tag.

* * * * *